US006619124B2

(12) United States Patent
Ogiura

(10) Patent No.: US 6,619,124 B2
(45) Date of Patent: Sep. 16, 2003

(54) ACCELERATION SENSOR AND METHOD OF MANUFACTURING THE SAME

(75) Inventor: Mitsugu Ogiura, Yasu-gun (JP)

(73) Assignee: Murata Manufacturing Co., Ltd., Kyoto (JP)

(*) Notice: Subject to any disclaimer, the term of this patent is extended or adjusted under 35 U.S.C. 154(b) by 26 days.

(21) Appl. No.: 10/045,977

(22) Filed: Jan. 10, 2002

(65) Prior Publication Data

US 2002/0139189 A1 Oct. 3, 2002

(30) Foreign Application Priority Data

Jan. 12, 2001 (JP) ........................................ 2001-004588

(51) Int. Cl.⁷ ............................................. G01P 15/09
(52) U.S. Cl. ..................................... 73/514.34; 310/357
(58) Field of Search .................... 73/514.34; 310/311, 310/328, 329, 357

(56) References Cited

U.S. PATENT DOCUMENTS

| 4,431,935 | A | * | 2/1984 | Rider ......................... 310/331 |
| 5,490,422 | A | * | 2/1996 | Tabota et al. ............. 73/514.34 |
| 5,515,725 | A | * | 5/1996 | Tabota et al. ............. 73/514.34 |
| 5,914,556 | A | * | 6/1999 | Tabota et al. ............... 310/328 |
| 5,991,988 | A | * | 11/1999 | Tabota et al. ............... 29/25.35 |

FOREIGN PATENT DOCUMENTS

| JP | 6-273439 | 9/1994 |
| JP | 8-75774 | 3/1996 |
| JP | 8-166401 | 6/1996 |
| JP | 10-62445 | 3/1998 |
| JP | 2000-121661 | 4/2000 |

* cited by examiner

Primary Examiner—Richard A. Moller
(74) Attorney, Agent, or Firm—Keating & Bennett, LLP

(57) ABSTRACT

An acceleration sensor includes a piezoelectric element and support frames for supporting the ends of the piezoelectric element in the longitudinal direction. The piezoelectric element is formed by stacking an even number of piezoelectric layers greater than or equal to six layers. Electrodes are provided in between the layers and on the front and back faces of the piezoelectric element. The interlayer electrodes including segmented electrodes and lead electrodes are alternately stacked with the piezoelectric layers therebetween. The interlayer electrode in the middle in the thickness direction is a lead electrode. The piezoelectric layers are polarized in the thickness direction so that charge having the same polarity is extracted from the electrodes when an acceleration is applied. Also, the center portion and both end portions of each piezoelectric layer are polarized in opposite directions.

6 Claims, 4 Drawing Sheets

ACCELERATION SENSOR AND METHOD OF MANUFACTURING THE SAME

BACKGROUND OF THE INVENTION

1. Field of the Invention

The present invention relates to acceleration sensors and manufacturing methods thereof.

2. Description of the Related Art

A known acceleration sensor utilizing piezoelectric ceramics is described in, for example, Japanese Unexamined Patent Application Publication No. 6-273439. The known acceleration sensor includes a piezoelectric element having a bimorph structure. The bimorph piezoelectric element is formed by bonding a pair of piezoelectric ceramic layers so as to face each other, providing an intermediate electrode between the piezoelectric ceramic layers, and providing signal extraction electrodes on the front and back faces of the bimorph piezoelectric element. The bimorph piezoelectric element is housed in and supported by a double beam structure. In the acceleration sensor, a center portion and both end portions of each of the piezoelectric ceramic layers in the longitudinal direction are polarized in opposite directions. Thus, charge generated in the center portion and both end portions can be externally extracted. As a result, the charge extraction efficiency can be improved.

In the bimorph acceleration sensor, it is necessary to differently polarize the center portion and the end portions of each of the piezoelectric ceramic layer. To this end, surface electrodes which are separated from each other are formed on a surface of the piezoelectric ceramic layer, and, after polarization, a connection electrode which completely covers the surface electrodes is formed, whereby a signal extraction electrode is formed. An acceleration sensor which can reduce the burden of two-step electrode formation is proposed in Japanese Unexamined Patent Application Publication No. 8-166401.

In both of the above-described acceleration sensors, the piezoelectric element is formed by the two piezoelectric ceramic layers, and the capacitance of the piezoelectric element is relatively small. Thus, the charge sensitivity is not very high.

In order to improve the charge sensitivity, an acceleration sensor including a piezoelectric element formed by stacking three piezoelectric ceramic layers is proposed (see Japanese Unexamined Patent Application Publication No. 10-62445). In this case, the capacitance is increased by increasing the number of piezoelectric layers being stacked. As a result, the charge sensitivity can be improved. The structure is, however, limited in that the polarization direction cannot be reversed in the same piezoelectric layer. Thus, charge can be extracted only from the center portion of a piezoelectric crystal, and the charge extraction efficiency is not very high.

SUMMARY OF THE INVENTION

Accordingly, it is an object of the present invention to provide an acceleration sensor which can efficiently collect charge generated by applying acceleration and which has a high charge sensitivity and a high detection sensitivity.

It is another object of the present invention to provide a manufacturing method for efficiently manufacturing an acceleration sensor which is thin and small and which has a high detection sensitivity.

The foregoing objects are achieved through provision of an acceleration sensor and a manufacturing method thereof according to the following aspects of the present invention.

According to a first aspect of the present invention, an acceleration sensor is provided including a piezoelectric element which is formed by stacking an even number of piezoelectric layers greater than or equal to six layers; support members for supporting both ends of the piezoelectric element in the longitudinal direction; and electrodes which are provided in between the layers and on the front and back faces of the piezoelectric element. The interlayer electrodes include electrodes which are segmented into portions in the longitudinal direction near inflection points between an expansion stress and a contraction stress applied to the piezoelectric element in response to the application of an acceleration and lead electrodes led to the ends of the piezoelectric element in the longitudinal direction. The two types of interlayer electrodes are alternately stacked with the piezoelectric layers therebetween. The interlayer electrode in the middle of the piezoelectric element in the thickness direction is the lead electrode led to the end in the longitudinal direction. The electrodes on the front and back faces of the piezoelectric element are led to the ends of the piezoelectric element in the longitudinal direction in order to extract generated charge. The piezoelectric layers are polarized in the thickness direction so that, when the acceleration is applied, charge having the same polarity is extracted from the lead electrodes led to the ends in the longitudinal direction in the piezoelectric layers on both sides of the lead electrodes and so that the center portion and both end portions of each piezoelectric layer are polarized in opposite directions.

According to a second aspect of the present invention, an acceleration sensor is provided including a piezoelectric element which is formed by stacking an odd number of piezoelectric layers greater than or equal to five layers; support members for supporting both ends of the piezoelectric element in the longitudinal direction; and electrodes which are formed in between the layers and on the front and back faces of the piezoelectric element. The interlayer electrodes include electrodes which are segmented into portions in the longitudinal direction near inflection points between an expansion stress and a contraction stress applied to the piezoelectric element in response to the application of an acceleration and lead electrodes led to the ends of the piezoelectric element in the longitudinal direction. The interlayer electrodes which are situated on both sides of the piezoelectric layer in the middle of the piezoelectric element in the thickness direction are the lead electrodes led to the ends in the longitudinal direction. The two types of interlayer electrodes are alternately stacked with the piezoelectric layers therebetween, excluding the piezoelectric layer in the middle in the thickness direction. The electrodes on the front and back faces of the piezoelectric element are led to the ends of the piezoelectric element in the longitudinal direction in order to extract generated charge. Among the piezoelectric layers, the piezoelectric layer in the middle in the thickness direction is not polarized. The other piezoelectric layers are polarized in the thickness direction so that, when the acceleration is applied, charge having the same polarity is extracted from the lead electrodes led to the ends in the longitudinal direction in the piezoelectric layers on both sides of the lead electrodes and so that the center portion and both end portions of each piezoelectric layer are polarized in opposite directions.

The acceleration sensor according to the first aspect of the present invention has a structure in which the piezoelectric element includes an even number of piezoelectric layers greater than or equal to six layers. The acceleration sensor according to the second aspect of the present invention has a structure in which the piezoelectric element includes an odd number of piezoelectric layers greater than or equal to five layers. In both structures, the number of piezoelectric layers is greater than that of a two-layer acceleration sensor. Thus, the capacitance can be increased. Because the center portion and both end portions of each of the piezoelectric layers are polarized in opposite directions, charge generated in the center portion and both end portions of the piezoelectric element can be efficiently collected, thus increasing the charge extraction efficiency. As a result, although the acceleration sensor has a multi-layered structure, generated charge can be extracted from both the center portion and the end portions. Thus, the acceleration sensor has a higher charge sensitivity than previously achieved.

When the acceleration sensor has a structure in which both ends of the piezoelectric element are supported, the center portion and both end portions of the piezoelectric element are subjected to different stresses (contraction and expansion) in response to the application of an acceleration. In order to obtain generated charge having the same polarity, it is necessary to reverse the polarization direction within each layer. Specifically, when polarizing each layer, it is necessary to apply voltages having different polarities to the center portion and to both end portions. In order to prevent short-circuits, it is necessary to electrically isolate the surface electrodes and the interlayer electrodes according to each region to which voltage is applied. At the same time, charge can be collected by electrically connecting the electrodes in the regions. Generally, it is necessary to electrically connect the electrodes in the regions after polarization. However, when the electrodes are isolated inside the ceramic, it is technically impossible to connect the electrodes after the polarization in such a layered compact generated by simultaneously firing the electrodes and the piezoelectric ceramic.

According to the present invention, electrodes (segmented electrodes) inside the ceramic and electrodes (lead electrodes) led to the ends of the piezoelectric element in the longitudinal direction are alternately formed, and polarization is performed in between these electrodes, thus achieving a structure in which the center portion and both end portions are polarized in different directions. By collecting charge from the lead electrodes, it is possible to efficiently extract the generated charge.

In a case in which the number of piezoelectric layers is 4n (n is an integer greater than or equal to 2) and a case in which the number of piezoelectric layers is 4n+2 (n is an integer greater than or equal to 1), polarization electrodes formed on the front and back faces of a piezoelectric ceramic fired compact are different in form. Specifically, when the number of piezoelectric layers is 4n+2, it is necessary to form segmented polarization electrodes on the front and back faces of the piezoelectric ceramic fired compact. With the segmented electrodes, the generated charge cannot be extracted from the ends in the longitudinal direction. It is thus necessary to form a connection electrode for connecting the segmented electrodes. Alternatively, the segmented electrodes can be removed, and subsequently new electrodes led to the ends of the piezoelectric element in the longitudinal direction can be formed. As a result, the charge can be extracted.

When the number of piezoelectric layers is 4n, the polarization electrodes are provided by forming lead electrodes led to the ends in the longitudinal direction on the front and back faces of the piezoelectric ceramic fired compact. These electrodes can be used as electrodes from which charge can be extracted.

According to a third aspect of the present invention, a manufacturing method for manufacturing an acceleration sensor is provided. Segmented electrodes and electrodes connected in the longitudinal direction are alternately stacked. Prior to cutting a piezoelectric ceramic fired compact (which functions as a base) into individual elements, the segmented electrodes are externally led. By applying a DC electric field in between the segmented electrodes and the electrodes connected in the longitudinal direction, polarization is performed so that the center portion and both end portions of each piezoelectric layer in the longitudinal direction are polarized in opposite directions. According to the present invention, ceramic green sheets are stacked, and firing of the ceramic green sheets and baking of a conductive paste are simultaneously performed. Although the acceleration sensor has a multi-layered structure, a thin piezoelectric element can be achieved. Thus, the capacitance can be improved. Because the piezoelectric ceramic fired compact is cut into elements after polarization, the manufacturing method is suitable for mass production and is capable of creating uniform piezoelectric elements.

According to an acceleration sensor of the present invention, a piezoelectric element has a structure obtained by stacking an even number of piezoelectric layers greater than or equal to six layers or an odd number of piezoelectric layers greater than or equal to five layers. Charge generated in response to the application of an acceleration can be extracted from the center portion and both end portion of each piezoelectric layer. The capacitance can be increased, and charge can be collected efficiently. As a result, it is possible to achieve an acceleration sensor with a high detection sensitivity.

DESCRIPTION OF THE PREFERRED EMBODIMENTS

Figure 1:
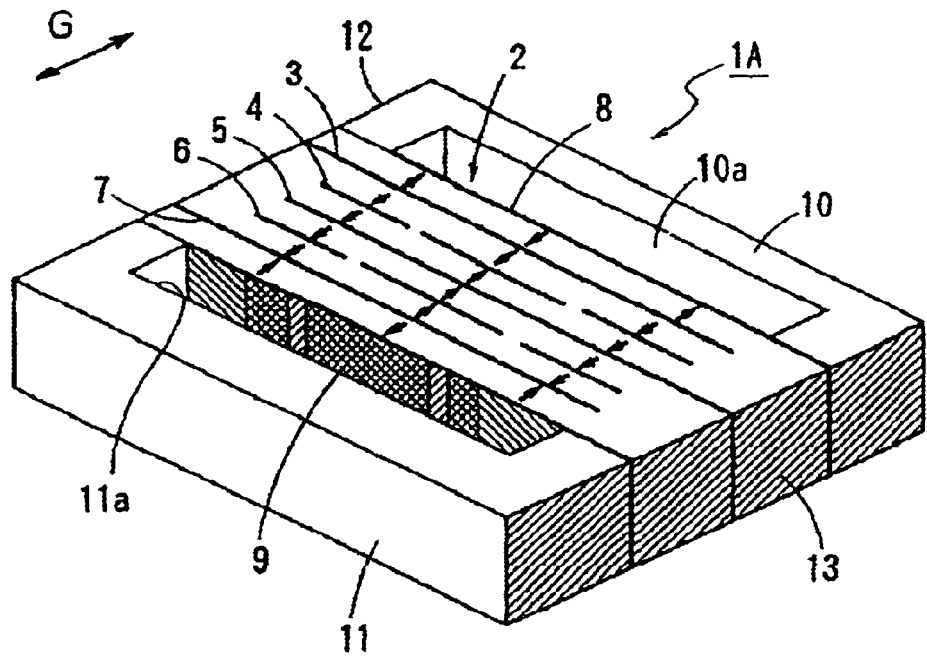
FIG. 1 is a perspective view of an acceleration sensor according to a first embodiment of the present invention.
Figure 2:
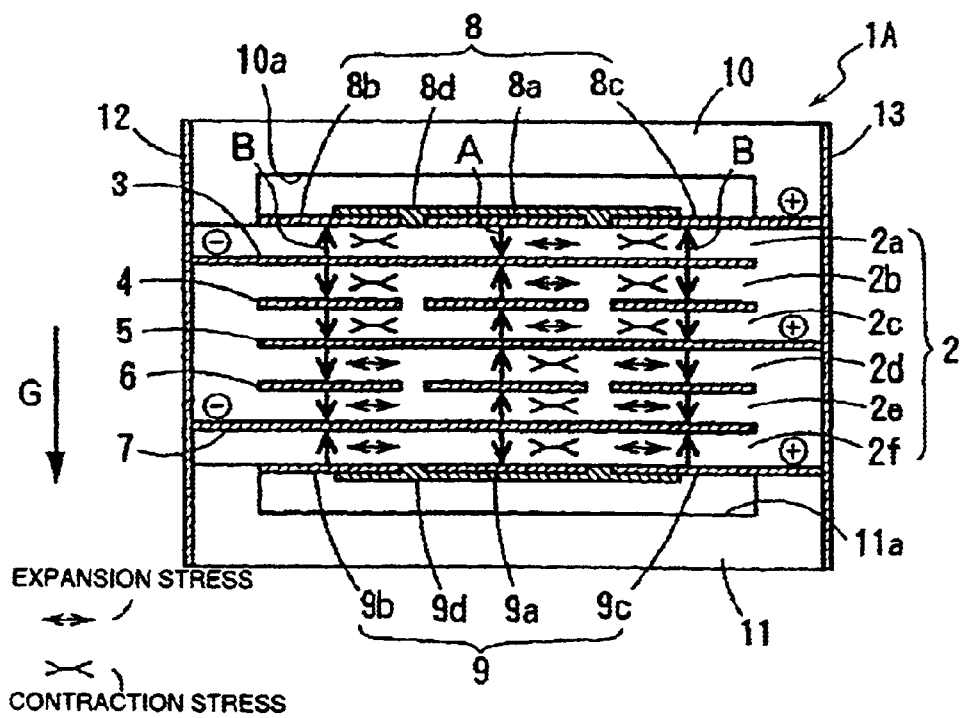
FIG. 2 is a front view of the acceleration sensor shown in FIG. 1.

FIGS. 1 to 3 show an acceleration sensor according to a first embodiment of the present invention.

An acceleration sensor 1A is formed by supporting a piezoelectric element 2 at both ends in the longitudinal direction by a pair of support frames (support members) 10 and 11 which have a substantially U-shaped cross section. The support frames 10 and 11 are formed of insulating ceramic which has approximately the same thermal expansion coefficient as the piezoelectric element 2. Inside the support frames 10 and 11, concave portions 10a and 11a are provided in order to enable the piezoelectric element 2 to bend in response to acceleration G.

The piezoelectric element 2 of the first embodiment is formed by stacking six strip-shaped, thin piezoelectric layers 2a, 2b, 2c, 2d, 2e, and 2f formed of piezoelectric ceramic and by integrally firing the piezoelectric layers 2a to 2f. Electrodes 3 to 7 are provided in between the layers of the piezoelectric element 2. Electrodes 8 and 9 are provided on the front and back faces of the piezoelectric element 2. The interlayer electrodes 3 to 7 include the segmented electrodes 4 and 6 and the lead electrodes 3, 5, and 7. The segmented electrodes 4 and 6 are each segmented into three portions in the longitudinal direction near inflection points between an expansion stress and a contraction stress applied to the piezoelectric element 2 in response to the application of an acceleration. The lead electrodes 3, 5 and 7 are led to different ends of the piezoelectric element 2 in the longitudinal direction. The two types of interlayer electrodes 3 to 7 are alternately stacked with the piezoelectric layers 2b to 2e therebetween. The interlayer electrode 5 in the middle of the piezoelectric element 2 in the thickness direction is a lead electrode which is led to the end of the piezoelectric element 2 in the longitudinal direction. The number of segmented portions of the segmented electrodes 4 and 6 is not limited to three. Moreover, the segmented electrodes 4 and 6 can be segmented at points other than the inflection points.

The electrodes 8 and 9 on the front and back faces of the piezoelectric element 2 are led to the same end as that of the lead electrode 5 in the middle in the thickness direction in order to extract the generated charge. Similar to the segmented electrodes 4 and 6, the electrodes 8 and 9 include electrodes 8a to 8c and electrodes 9a to 9c, which are obtained by dividing the electrodes into three near the inflection points, and connection electrodes 8d and 9d for connecting the electrodes 8a to 8c and 9a to 9c, respectively. Among the electrodes 8a to 8c and 9a to 9c, the electrodes 8c and 9d are led to one end of the piezoelectric element 2 in the longitudinal direction. It is not necessary for each of the connection electrodes 8d and 9d to be a single electrode. For example, the connection electrode 8d may include an electrode that connects the electrodes 8a and 8b and an electrode that connects the electrodes 8a and 8c.

External electrodes 12 and 13 are formed on both end faces of the piezoelectric element 2 in the longitudinal direction, including end faces of the support frames 10 and 11. The external electrode 12 which is formed on one end face conducts to the lead electrodes 3 and 7. The external electrode 13 which is formed on the other end face conducts to the electrodes 8 and 9 on the front and back faces and to the lead electrode 5.

The piezoelectric layers 2a to 2f are polarized in the directions indicated by the bold arrows in FIG. 2. Specifically, the piezoelectric layers on both sides of the lead electrodes 3, 5, and 7 are polarized so that, when the acceleration G is applied to the piezoelectric element 2 in the plate-thickness direction, charge having the same polarity can be extracted from the lead electrodes 3, 5, and 7 in the piezoelectric layers on both sides of the lead electrodes 3, 5, and 7. Also, the center portion and both end portions of each piezoelectric layer are polarized in opposite directions. In the first embodiment, the center portion of each of the first and sixth layers 2a and 2f is in direction A and both end portions thereof are in direction B. The center portion of each of the second to fifth layers 2b to 2e is in direction B and both end portions thereof are in direction A.

For example, when acceleration G is applied in the direction indicated by the arrow in FIG. 2, due to inertia, the center portion of the piezoelectric element 2 is deformed so as to be convex in the upward direction in FIG. 2. As a result, the center portions of the first to third layers 2a to 2c are subjected to an expansion stress, and the end portions thereof are subjected to a contraction stress. The center portions of the fourth to sixth layers 2d to 2f are subjected to a contraction stress, and the end portions thereof are subjected to an expansion stress. On the basis of the relationships between the stresses and the polarization directions, negative charge is generated at the lead electrodes 3 and 7, and positive charge is generated at the electrodes 8 and 9 on the front and back faces and the lead electrode 5. The negative charge is extracted from the external electrode 12 formed on one end face, and the positive charge is extracted from the external electrode 13 formed on the other end face.

Even though the acceleration sensor 1A has a layered structure, generated charge can be collected from both the center portion and the end portions of each piezoelectric layer. Thus, the amount of charge collected in response to the application of the acceleration G is increased, and the acceleration sensor 1A has a higher detection sensitivity than previously achieved.

Table 1 shows a comparison among the piezoelectric sensor 1A using the six-layered piezoelectric element 2 in the first embodiment, an acceleration sensor X (see FIG. 1 of Japanese Unexamined Patent Application Publication No. 8-166401) which has a two-layer structure and which is polarized in the thickness direction so that piezoelectric layers on both sides of an inner electrode are polarized in opposite directions and so that the center portion and both end portions of each piezoelectric layer are polarized in opposite directions, and an acceleration sensor Y (see FIG. 1 of Japanese Unexamined Patent Application Publication No. 2000-121661) which similarly has a two-layer structure and which is polarized in the thickness direction so that piezoelectric layers on both sides of an inner electrode are polarized in the same direction and so that the center portion and both end portions of each piezoelectric layer are polarized in opposite directions. The comparison is indicated by assuming the capacitance, generated charge, and the voltage sensitivity of an acceleration sensor B to be 1. The piezoelectric elements subjected to comparison have the same shape.

As is clear from Table 1, the capacitance of the acceleration sensor 1A of the present invention is 4.5 times to 18 times that of the known acceleration sensors X and Y. The amount of charge generated by the acceleration sensor 1A is 2.3 times to 4.7 times that of the known acceleration sensors X and Y. It can be concluded that the acceleration sensor 1A has a good detection sensitivity.

TABLE 1

| Acceleration Sensor | Capacitance Ratio | Generated Charge Ratio |
| --- | --- | --- |
| X | 1 | 1 |
| Y | 4 | 2 |
| 1A | 18.2 | 4.7 |

Referring to FIGS. 3A to 3F, a manufacturing method for manufacturing the acceleration sensor 1A arranged as described above will now be described.

Figure 3A:
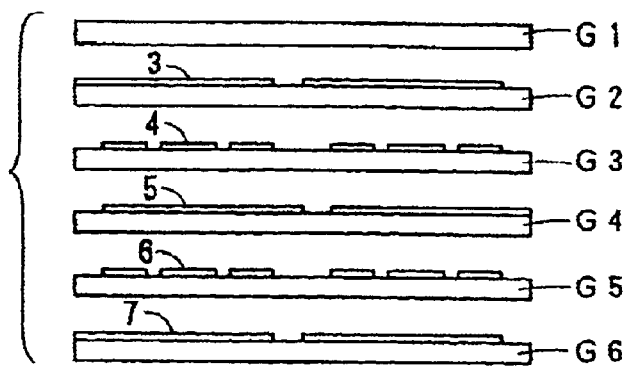
FIGS. 3A to 3F include process charts for illustrating a manufacturing method for manufacturing the acceleration sensor shown in FIG. 1.

Referring to FIG. 3A, the process prepares six thin, rectangular ceramic green sheets G1 to G6 of a size large enough for a plurality of piezoelectric elements. Among the ceramic green sheets G1 to G6, a conductive paste, which is to become the lead electrode 3, is applied to the top surface of the second green sheet G2 using a screen printing technique or the like. Similarly, a conductive paste, which is to become the segmented electrode 4, is applied to the top surface of the third green sheet G3. A conductive paste, which is to become the lead electrode 5, is applied to top surface of the fourth green sheet G4. A conductive paste, which is to become the segmented electrode 6, is applied to the top surface of the fifth green sheet G5. A conductive paste, which is to become the lead electrode 7, is applied to the top surface of the sixth green sheet G6. The application patterns of the electrodes 3 to 7 form strip electrodes extending in a direction perpendicular to the drawing. No conductive paste is applied to the top green sheet G1.

Figure 3B:
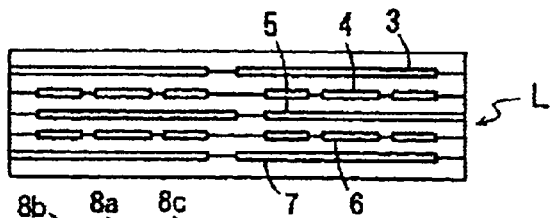

Referring to FIG. 3B, the six green sheets G1 to G6 are stacked and attached using pressure, thus forming a layered compact L. The lead electrodes 3, 5, and 7 and the segmented electrodes 4 and 6 are situated in between the green sheets. The layered compact L is fired at a predetermined temperature (for example, approximately 1000° C.), and hence the stacked green sheets are bonded to each other. At the same time, the electrodes 3 to 7 which are formed inside are also baked. Accordingly, a piezoelectric ceramic fired compact F is formed.

Figure 3C:
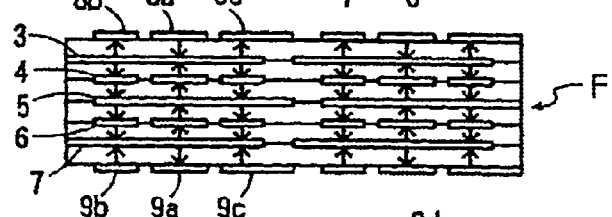

Referring to FIG. 3C, a conductive paste is applied to the front and back faces of the piezoelectric ceramic fired compact F. Subsequently, the piezoelectric ceramic fired compact F is subjected to drying and baking. As a result, the segmented electrodes 8a to 8c and 9a to 9c are formed. A DC electric field is applied to the electrodes 8a to 8c and 9a to 9c and in between the lead electrodes 3, 5, and 7 and the segmented electrodes 4 and 6, thus polarizing the piezoelectric ceramic fired compact F in directions A and B. Since the interlayer electrodes 3 to 7 are provided inside the piezoelectric ceramic fired compact F, it is difficult to apply an electric field to these electrodes 3 to 7. The electrodes 3 to 7 are strip electrodes extending in the depth direction of the piezoelectric ceramic fired compact F (perpendicular to the drawing). In order to apply an electric field to the electrodes 3 to 7, one end of each of the electrodes 3 to 7 is led outside the piezoelectric ceramic fired compact F. By applying a DC electric field in between the electrodes 3 to 7 and the electrodes 8a to 8c and 9a to 9c on the front and back faces, the piezoelectric ceramic fired compact F can be polarized in desired directions.

The polarization can be performed by a plurality of steps. Alternatively, the polarization can be performed by a single step using a plurality of voltages which have different polarities.

Figure 3D:
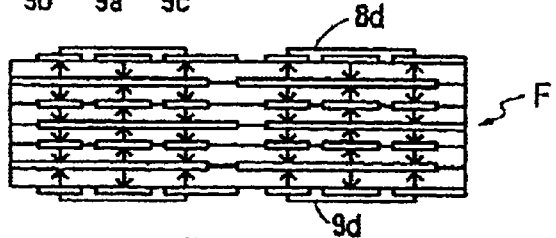

After the polarization, as shown in FIG. 3D, the connection electrodes 8d and 9d for connecting the segmented electrodes 8a to 8c and 9a to 9c are formed on the front and back faces of the piezoelectric ceramic fired compact F. The connection electrodes 8d and 9d can be formed by printing a conductive paste or by a thin film formation method such as sputtering or evaporation.

Figure 3E:
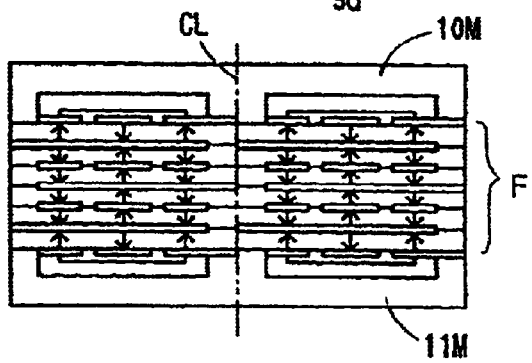
Figure 3F:
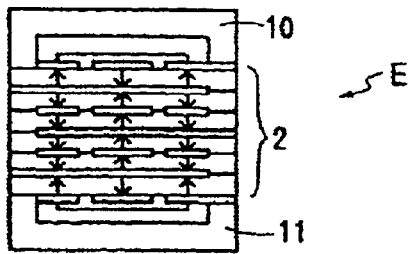

After the connection electrodes 8d and 9d are formed, as shown in FIG. 3E, support frames 10M and 11M, which function as a base, are bonded to the front and back faces of the piezoelectric ceramic fired compact F. The piezoelectric ceramic fired compact F and the support frames 10M and 11M are cut into elements in the longitudinal direction (cut line CL) and in a direction parallel to the drawing, thus creating a sensor element E shown in FIG. 3F.

Subsequently, the external electrodes 12 and 13 are formed on both end faces of each sensor element E. Consequently, the acceleration sensor 1A shown in FIGS. 1 and 2 is formed.

In the manufacturing method shown in FIGS. 3A to 3F, the segmented electrodes 8a to 8c and 9a to 9c for polarization are formed on the front and back faces of the piezoelectric element. After the polarization, the connection electrodes 8d and 9d for connecting the segmented electrodes 8a to 8c and 9a to 9c are provided. Alternatively, after the polarization, the segmented electrodes 8a to 8c and 9a to 9c are removed. Subsequently, new electrodes 8 and 9 leading to different ends of the piezoelectric element in the longitudinal direction can be formed.

In this case, the lead electrodes 8 and 9 can be formed by printing a conductive paste or by a thin film formation method such as sputtering or evaporation.

Figure 4:
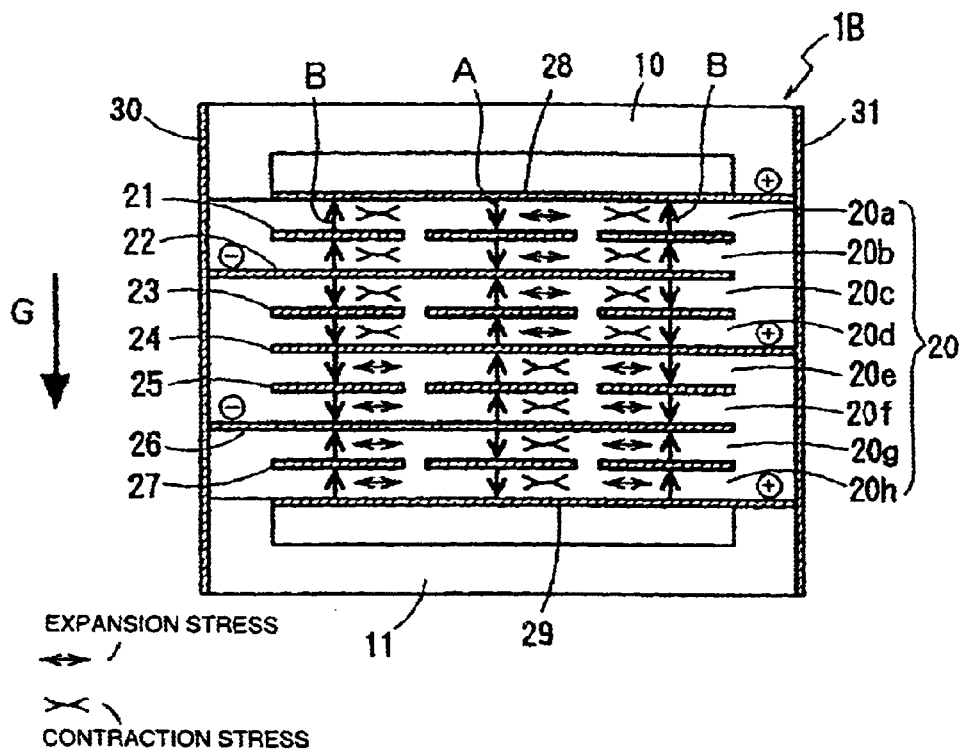
FIG. 4 is a front view of an acceleration sensor according to a second embodiment of the present invention.

FIG. 4 shows an acceleration sensor according to a second embodiment of the present invention.

In an acceleration sensor 1B of the second embodiment, the number of piezoelectric layers forming a piezoelectric element 20 is eight. Since the support frames 10 and 11 are the same as those shown in FIG. 2, the same reference numerals are given and repeated descriptions of the common portions are omitted.

The piezoelectric element 20 is formed by stacking eight piezoelectric layers 20a to 20h and integrally firing the piezoelectric layers 20a to 20h. Electrodes 21 to 27 are formed in between the layers of the piezoelectric element 20. Electrodes 28 and 29 are formed on the front and back faces of the piezoelectric element 20. The interlayer electrodes 21 to 27 include the segmented electrodes 21, 23, 25, and 27 which are segmented into three portions in the longitudinal direction near inflection points between an expansion stress and a contraction stress applied to the piezoelectric element 20 in response to the application of an acceleration and the lead electrodes 22, 24, and 26 which are led to different ends of the piezoelectric element 20 in the longitudinal direction. The two types of interlayer electrodes 21 to 27 are alternately stacked with the piezoelectric layers 20a and 20f therebetween. The interlayer electrode 24 in the middle of the piezoelectric element 20 in the thickness direction is a lead electrode led to the end in the longitudinal direction.

The electrodes 28 and 29 on the front and back faces of the piezoelectric element 20 are led to the same end as that of the lead electrode 24 in the middle in the thickness direction in order to extract generated charge. External electrodes 30 and 31 are formed on both end faces of the piezoelectric element 20 in the longitudinal direction, including the end faces of the support frames 10 and 11. The external electrode 30 formed on one end face conducts to the lead electrodes 22 and 26. The external electrode 31 formed on the other end face conducts to the electrodes 28 and 29 formed on the front and back faces and to the lead electrode 24.

The piezoelectric layers 20a to 20h are polarized in the directions indicated by the bold arrows in FIG. 4. Specifically, the piezoelectric layers 20a to 20h are polarized in the thickness direction so that the piezoelectric layers on both sides of the interlayer electrodes 22 and 26 are polarized in opposite directions and so that the center portion and both end portions of each piezoelectric layer are polarized in opposite directions. The interlayer electrode 24 in the middle in the thickness direction is polarized so that the piezoelectric layers on both sides of the interlayer electrode 24 are polarized in opposite directions and so that the center portion and both end portions of each piezoelectric layer are polarized in opposite directions. In the second embodiment, the center portions of the first, second, seventh, and eighths layers 20a, 20b, 20g, and 20h are in direction A and both end portions thereof are in direction B. The center portions of the third to sixth layers 20c to 20f are in direction B, and both end portions thereof are in direction A. When acceleration G is applied to the piezoelectric element 20 in the direction indicated by the arrow, as shown in FIG. 4, the center portion and both end portions of each layer are subjected to an expansion stress and a contraction stress. On the basis of the relationships between the stresses and the polarization directions, negative charge is generated at the lead electrodes 22 and 26, and positive charge is generated at the electrode 24 and the electrodes 28 and 29 on the front and back faces. The negative charge is extracted from the external electrode 30, and the positive charge is extracted from the external electrode 31.

In this case, similar to the first embodiment, the amount of charge generated in response to the application of the acceleration G is increased. Thus, the acceleration sensor 1B has a higher detection sensitivity than previously achieved.

Figure 5:
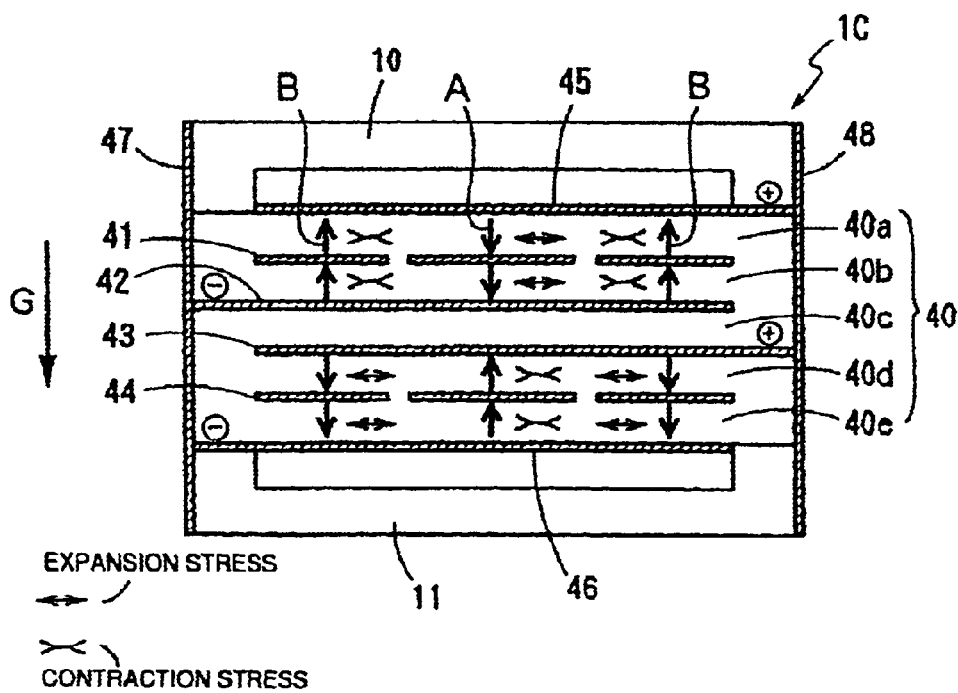
FIG. 5 is a front view of an acceleration sensor according to a third embodiment of the present invention.

FIG. 5 shows an acceleration sensor according to a third embodiment of the present invention.

An acceleration sensor 1C of the sixth embodiment uses a piezoelectric element 40 which has five piezoelectric layers. Since the support frames 10 and 11 are the same as those shown in FIG. 2, the same reference numerals are given and repeated descriptions of the common portions are omitted.

The piezoelectric element 40 is formed by stacking seven piezoelectric layers 40a to 40e and integrally firing the piezoelectric layers 40a to 40e. Electrodes 41 to 44 are formed in between the layers of the piezoelectric element 40. Electrodes 45 and 46 are formed on the front and back faces of the piezoelectric element 40. The interlayer electrodes 41 to 44 include the segmented electrodes 41 and 44 which are segmented into three portions in the longitudinal direction near inflection points between an expansion stress and a contraction stress applied to the piezoelectric element 40 in response to the application of an acceleration and the lead electrodes 42 and 43 which are led to different ends of the piezoelectric element 40 in the longitudinal direction. The interlayer electrodes 42 and 43 situated on both sides of the piezoelectric layer 40c in the middle of the piezoelectric element 40 in the thickness direction are lead electrodes led to the ends in the longitudinal direction. The two types of interlayer electrodes 41 to 44 are alternately stacked with the piezoelectric layers 40a to 40g therebetween, excluding the piezoelectric layer 40c in the middle in the thickness direction.

The electrodes 45 and 46 on the front and back faces of the piezoelectric element 40 are led to different ends of the piezoelectric element 40 in the longitudinal direction in order to extract generated charge. External electrodes 47 and 48 are formed on both end faces of the piezoelectric 40 in the longitudinal direction, including the end faces of the support frames 10 and 11. The external electrode 47 formed on one end face conducts to the electrode 46 on the back face and to the lead electrode 42. The external electrode 48 formed on the other end face conducts to the electrode 45 formed on the front face and to the lead electrode 43.

The piezoelectric layers 40a to 40e are polarized in the directions indicated by the bold arrows in FIG. 5. Specifically, the piezoelectric layers 40a to 40e are polarized in the thickness direction so that the center portion and both end portions of each piezoelectric layer are polarized in opposite directions. In the third embodiment, the center portions of the first and second layers 40a and 40b are in direction A and both end portions thereof are in direction B. The center portions of the fourth and fifth layers 40d and 40e are in direction B, and both end portions thereof are in direction A. The piezoelectric layer 40c in the middle in the thickness direction is a neutral layer which is not polarized. When acceleration G is applied to the piezoelectric element 40 in the plate-thickness direction, as shown in FIG. 5, the center portion and both end portions of each layer are subjected to an expansion stress and contraction stress. On the basis of the relationships between the stresses and the polarization directions, negative charge is generated at the lead electrode 42 and the back-face electrode 46, and positive charge is generated at the lead electrode 43 and the front-face electrode 45. The negative charge is extracted from the external electrode 47, and the positive charge is extracted from the external electrode 48.

Although the piezoelectric layer 40c in the middle in the thickness direction is a neutral layer which generates no charge, similar to the first embodiment, charge can be extracted from the center portion and both end portions in the longitudinal direction. Thus, the amount of charge generated in response to the application of the acceleration G is increased, and the acceleration sensor 1C has a higher detection sensitivity than previously achieved.

Figure 6:
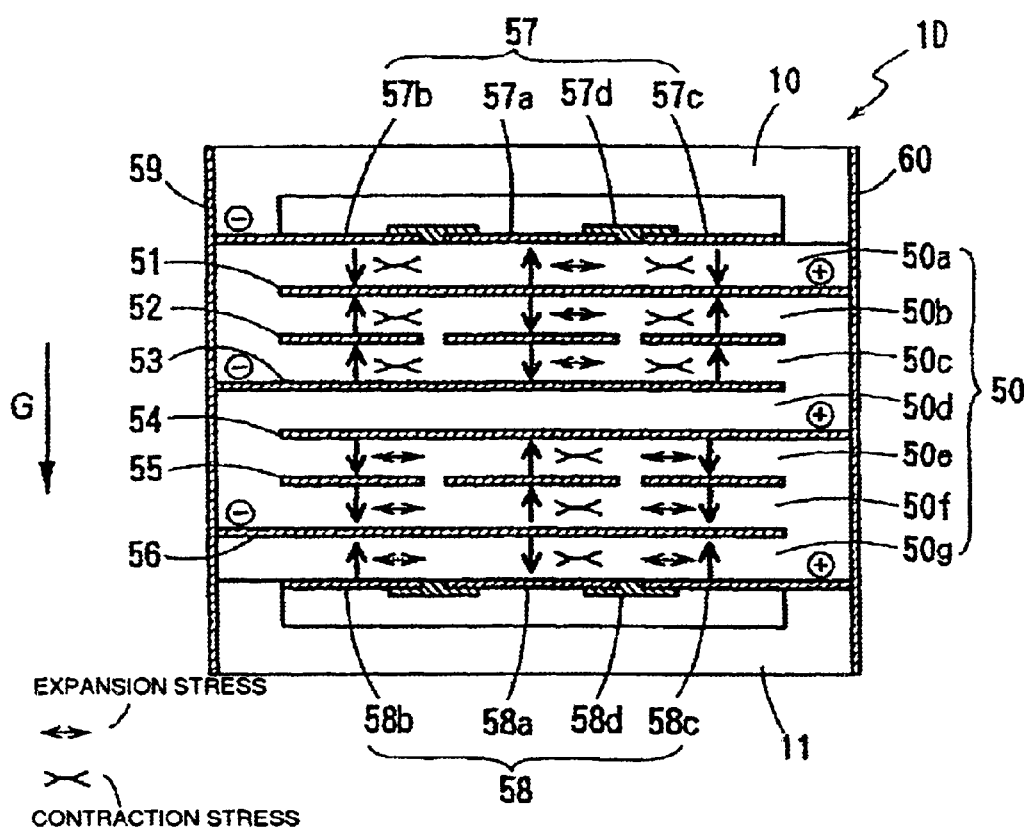
FIG. 6 is a front view of an acceleration sensor according to a fourth embodiment of the present invention.

FIG. 6 shows an acceleration sensor according to a fourth embodiment of the present invention.

An acceleration sensor 1D of the fifth embodiment uses a piezoelectric element 50 which has seven piezoelectric layers. Since the support frames 10 and 11 are the same as those shown in FIG. 2, the same reference numerals are given and repeated descriptions of the common portions are omitted.

The piezoelectric element 50 is formed by stacking seven piezoelectric layers 50a to 50g and integrally firing the piezoelectric layers 50a to 50g. Electrodes 51 to 56 are formed in between the layers of the piezoelectric element 50. Electrodes 57 and 58 are formed on the front and back faces of the piezoelectric element 50. The interlayer electrodes 51 to 56 include the segmented electrodes 52 and 55 which are segmented into three portions in the longitudinal direction near inflection points between an expansion stress and a contraction stress applied to the piezoelectric element 50 in response to the application of an acceleration and the lead electrodes 51, 53, 54, and 56 which are led to different ends of the piezoelectric element in the longitudinal direction. The interlayer electrodes 53 and 54 on both sides of the piezoelectric layer 50d in the middle of the piezoelectric element 50 in the thickness direction are lead electrodes which are led to the ends in the longitudinal direction. The two types of interlayer electrodes 51 to 56 are alternately stacked with the piezoelectric layers 50a to 50g therebetween, excluding the piezoelectric layer 50d in the middle in the thickness direction.

The electrodes 57 and 58 on the front and back faces of the piezoelectric element 50 are led to different ends of the piezoelectric element 50 in the longitudinal direction in order to extract generated charge. Similar to the segmented electrodes 52 and 55, the electrodes 57 and 58 include electrodes 57a to 57c and 58a to 58c which are obtained by segmenting electrodes into three portions near the inflection points and connection electrodes 57d and 58d for connecting the electrodes 55a to 55c and 56a to 55c. The electrodes 57 and 58 on the front and back faces are led to different ends of the piezoelectric element 50 in the longitudinal direction in order to extract generated charge. External electrodes 59 and 60 are formed on both end faces of the piezoelectric 50 in the longitudinal direction, including the end faces of the support frames 10 and 11. The external electrode 59 formed on one end face conducts to the electrode 57 on the front face and to the lead electrodes 53 and 56. The external electrode 60 formed on the other end face conducts to the electrode 58 formed on the back face and to the lead electrodes 51 and 54.

The piezoelectric layers 50a to 50g are polarized in the directions indicated by the bold arrows in FIG. 6. Specifically, the piezoelectric layers 50a to 50g are polarized in the thickness direction so that charge displaying the same polarity can be extracted from the lead electrodes 51 and 56 in the piezoelectric layers on both sides of the lead electrodes 51 and 56 and so that the center portion and both end portions of each piezoelectric layer are polarized in opposite directions. In the fourth embodiment, the center portions of the second, third, and seventh layers 50b, 50c, and 50g are in direction A, and both end portions thereof are in direction B. The center portions of the first, fifth, and sixth layers 50a, 50e, and 50f are in direction B, and both end portions thereof are in direction A. The piezoelectric layer 50d in the middle in the thickness direction is a neutral layer which is not polarized. When acceleration G is applied to the piezoelectric element 50 in the plate-thickness direction, as shown in FIG. 6, the center portion and both end portions of each layer are subjected to an expansion stress and a contraction stress. On the basis of the relationships between the stresses and the polarization directions, negative charge is generated at the lead electrodes 53 and 56 and the front-face electrode 57, and positive charge is generated at the lead electrodes 51 and 54 and the back-face electrode 58. The negative charge is extracted from the external electrode 59, and the positive charge is extracted from the external electrode 60.

Although the piezoelectric layer 50d in the middle in the thickness direction is a neutral layer which generates no charge, similar to the first embodiment, charge can be extracted from the center portion and both end portions in the longitudinal direction. Thus, the amount of charge generated in response to the application of the acceleration G is increased, and hence the acceleration sensor ID has a higher detection sensitivity than previously achieved.

In the foregoing embodiments, a case in which the number of layers is 4n+2 has been described in the first embodiment. A case in which the number of layers is 4n (n is greater than or equal to 2) has been described in the second embodiment. A case in which the number of layers is 4n+1 has been described in the third embodiment. A case in which the number of layers is 4n+3 has been described in the fourth embodiment. These cases are only a few examples. The number of layers can be increased.

In the example shown in FIG. 3, the piezoelectric element is formed by stacking the ceramic green sheets through the intermediary of a conductive paste and simultaneously firing the ceramic green sheets. Alternatively, a piezoelectric element can be formed by stacking a plurality of pre-fired ceramic sheets. However, the use of ceramic green sheets is advantageous over the use of pre-fired ceramic sheets in that a thinner piezoelectric element can be formed by stacking the ceramic green sheets. Thus, the capacitance can be increased, and the piezoelectric element can be miniaturized. Also, the manufacturing method can be simplified. For these reasons, the use of ceramic green sheets is preferable.

What is claimed is:

1. An acceleration sensor comprising:
a piezoelectric element which is formed by stacking an even number of piezoelectric layers greater than or equal to six layers;
support members for supporting both ends of the piezoelectric element in the longitudinal direction; and
electrodes which are provided in between the layers and on the front and back faces of the piezoelectric element,
wherein the interlayer electrodes include electrodes which are segmented into portions in the longitudinal direction near inflection points between an expansion stress and a contraction stress applied to the piezoelectric element in response to the application of an acceleration and lead electrodes led to the ends of the piezoelectric element in the longitudinal direction,
the two types of interlayer electrodes are alternately stacked with the piezoelectric layers therebetween,
the interlayer electrode in the middle of the piezoelectric element in the thickness direction is the lead electrode led to the end in the longitudinal direction,
the electrodes on the front and back faces of the piezoelectric element are led to the ends of the piezoelectric element in the longitudinal direction in order to extract generated charge, and
the piezoelectric layers are polarized in the thickness direction so that, when the acceleration is applied, charge having the same polarity is extracted from the lead electrodes led to the ends in the longitudinal direction in the piezoelectric layers on both sides of the lead electrodes and so that the center portion and both end portions of each piezoelectric layer are polarized in opposite directions.

2. An acceleration sensor comprising:
a piezoelectric element which is formed by stacking an odd number of piezoelectric layers greater than or equal to five layers;
support members for supporting both ends of the piezoelectric element in the longitudinal direction; and
electrodes which are formed in between the layers and on the front and back faces of the piezoelectric element,
wherein the interlayer electrodes include electrodes which are segmented into portions in the longitudinal direction near inflection points between an expansion stress and a contraction stress applied to the piezoelectric element in response to the application of an acceleration and lead electrodes led to the ends of the piezoelectric element in the longitudinal direction,
the interlayer electrodes which are arranged on both sides of the piezoelectric layer in the middle of the piezoelectric element in the thickness direction are the lead electrodes led to the ends in the longitudinal direction,
the two types of interlayer electrodes are alternately stacked with the piezoelectric layers therebetween, excluding the piezoelectric layer in the middle in the thickness direction,
the electrodes on the front and back faces of the piezoelectric element are led to the ends of the piezoelectric element in the longitudinal direction in order to extract generated charge, and
among the piezoelectric layers, the piezoelectric layer in the middle in the thickness direction is not polarized, and the other piezoelectric layers are polarized in the thickness direction so that, when the acceleration is applied, charge having the same polarity is extracted from the lead electrodes led to the ends in the longitudinal direction in the piezoelectric layers on both sides of the lead electrodes and so that the center portion and both end portions of each piezoelectric layer are polarized in opposite directions.

3. A manufacturing method for manufacturing an acceleration sensor, comprising the steps of:
preparing 4n+2 planar green sheets made of piezoelectric ceramic, where n is an integer greater than or equal to 1;

applying a conductive paste on surfaces of at least two of the green sheets at positions corresponding to a center portion and both end portions of individual piezoelectric elements in the longitudinal direction, whereby segmented electrodes are formed for a plurality of piezoelectric elements;

applying a conductive paste on surfaces of at least three of the other green sheets so that the conductive paste is led to positions corresponding to ends of each piezoelectric element in the longitudinal direction, whereby lead electrodes are formed for the plurality of piezoelectric elements;

stacking the green sheets so that the segmented electrodes and the lead electrodes are alternately arranged and so that the electrode in the middle in the thickness direction is the lead electrode;

firing the green sheets to produce a piezoelectric ceramic fired compact which includes a plurality of piezoelectric layers and simultaneously baking the conductive paste;

forming polarization electrodes on the front and back faces of the piezoelectric ceramic fired compact, the polarization electrodes being segmented into portions according to the positions corresponding to the center portion and both end portions of each piezoelectric element;

applying a DC electric field to the polarization electrodes and in between the segmented electrodes and the lead electrodes to polarize the piezoelectric ceramic fired compact in the thickness direction so that, when an acceleration is applied, charge having the same polarity is extracted from the lead electrodes in the piezoelectric layers on both sides of the lead electrodes and so that the center portion and both end portions of each piezoelectric layer are polarized in opposite directions;

interconnecting the portions of the polarization electrodes or forming continuous electrodes after removing the polarization electrodes, whereby lead electrodes leading to the ends of the piezoelectric element in the longitudinal direction are formed on the front and back faces of the piezoelectric element, cutting the piezoelectric ceramic fired compact into individual piezoelectric elements; and forming external electrodes on both end faces of the cut piezoelectric element and connecting the external electrodes and the lead electrodes which are formed inside and on the front and back faces of the piezoelectric element.

4. A manufacturing method for manufacturing an acceleration sensor, comprising the steps of:

preparing 4n planar green sheets made of piezoelectric ceramic, where n is an integer greater than or equal to 2;

applying a conductive paste on surfaces of at least four of the green sheets at positions corresponding to a center portion and both end portions of individual piezoelectric elements in the longitudinal direction, whereby segmented electrodes are formed for a plurality of piezoelectric elements;

applying a conductive paste on surfaces of at least three of the other green sheets so that the conductive paste is led to positions corresponding to ends of each piezoelectric element in the longitudinal direction, whereby lead electrodes are formed for the plurality of piezoelectric elements;

stacking the green sheets so that the segmented electrodes and the lead electrodes are alternately arranged and so that the electrode in the middle in the thickness direction is the lead electrode;

firing the green sheets to produce a piezoelectric ceramic fired compact which includes a plurality of piezoelectric layers and simultaneously baking the conductive paste;

forming lead electrodes on the front and back faces of the piezoelectric ceramic fired compact, the lead electrodes being led to positions corresponding to the ends of each piezoelectric element in the longitudinal direction;

applying a DC electric field in between the segmented electrodes and the lead electrodes to polarize the piezoelectric ceramic fired compact in the thickness direction so that, when an acceleration is applied, charge having the same polarity is extracted from the lead electrodes in the piezoelectric layers on both sides of the lead electrodes and so that the center portion and both end portions of each piezoelectric layer are polarized in opposite directions;

cutting the piezoelectric ceramic fired compact into individual piezoelectric elements; and forming external electrodes on both end faces of the cut piezoelectric element and connecting the external electrodes and the lead electrodes which are formed inside and on the front and back faces of the piezoelectric element.

5. A manufacturing method for manufacturing an acceleration sensor, comprising the steps of:

preparing 4n+1 planar green sheets made of piezoelectric ceramic, where n is an integer greater than or equal to 1;

applying a conductive paste on surfaces of at least two of the green sheets at positions corresponding to a center portion and both end portions of individual piezoelectric elements in the longitudinal direction, whereby segmented electrodes are formed for a plurality of piezoelectric elements;

applying a conductive paste on surfaces of at least two of the other green sheets so that the conductive paste is led to positions corresponding to ends of each piezoelectric element in the longitudinal direction, whereby lead electrodes are formed for the plurality of piezoelectric elements;

stacking the green sheets so that the electrodes arranged on both sides of the piezoelectric layer in the middle in the thickness direction are the lead electrodes and so that the segmented electrodes and the lead electrodes are alternately arranged in the other piezoelectric layers;

firing the green sheets to produce a piezoelectric ceramic fired compact which includes a plurality of piezoelectric layers and simultaneously baking the conductive paste;

forming lead electrodes on the front and back faces of the piezoelectric ceramic fired compact, the lead electrodes being led to the positions corresponding to the ends of each piezoelectric element in the longitudinal direction;

applying a DC electric field in between the segmented electrodes and the lead electrodes to polarize the piezoelectric ceramic fired compact in the thickness direction so that, when an acceleration is applied, charge having the same polarity is extracted from the lead electrodes in the piezoelectric layers on both sides of the lead electrodes and so that the center portion and both end portions of each piezoelectric layer are polarized in opposite directions;

cutting the piezoelectric ceramic fired compact into individual piezoelectric elements; and forming external electrodes on both end faces of the cut piezoelectric element and connecting the external electrodes and the lead electrodes which are formed inside and on the front and back faces of the piezoelectric element.

6. A manufacturing method for manufacturing an acceleration sensor, comprising the steps of:

preparing 4n+3 planar green sheets made of piezoelectric ceramic, where n is an integer greater than or equal to 1;

applying a conductive paste on surfaces of at least two of the green sheets at positions corresponding to a center portion and both end portions of individual piezoelectric elements in the longitudinal direction, whereby segmented electrodes are formed for a plurality of piezoelectric elements;

applying a conductive paste on surfaces of at least four of the other green sheets so that the conductive paste is led to positions corresponding to ends of each piezoelectric element in the longitudinal direction, whereby lead electrodes are formed for the plurality of piezoelectric elements;

stacking the green sheets so that the electrodes arranged on both sides of the piezoelectric layer in the middle in the thickness direction are the lead electrodes and so that the segmented electrodes and the lead electrodes are alternately arranged in the other piezoelectric layers;

firing the green sheets to produce a piezoelectric ceramic fired compact which includes a plurality of piezoelectric layers and simultaneously baking the conductive paste;

forming polarization electrodes on the front and back faces of the piezoelectric ceramic fired compact, the polarization electrodes being segmented into portions according to the positions corresponding to the center portion and both end portions of each piezoelectric element;

applying a DC electric field to the polarization electrodes and in between the segmented electrodes and the lead electrodes to polarize the piezoelectric ceramic fired compact in the thickness direction so that, when an acceleration is applied, charge having the same polarity is extracted from the lead electrodes in the piezoelectric layers on both sides of the lead electrodes and so that the center portion and both end portions of each piezoelectric layer are polarized in opposite directions;

interconnecting the portions of the polarization electrodes or forming continuous electrodes after removing the polarization electrodes, whereby lead electrodes leading to the ends of the piezoelectric element in the longitudinal direction are formed on the front and back faces of the piezoelectric element, cutting the piezoelectric ceramic fired compact into individual piezoelectric elements; and forming external electrodes on both end faces of the cut piezoelectric element and connecting the external electrodes and the lead electrodes which are formed inside and on the front and back faces of the piezoelectric element.

* * * * *